United States Patent [19]

Heismann

[11] 4,195,466
[45] Apr. 1, 1980

[54] MULTI-FUNCTION INTERLOCK SELF-PROPELLED LAWN MOWER WITH BLADE CLUTCH

[75] Inventor: Richard A. Heismann, Knoxville, Ill.

[73] Assignee: Outboard Marine Corporation, Waukegan, Ill.

[21] Appl. No.: 904,525

[22] Filed: May 10, 1978

[51] Int. Cl.² .............................................. A01D 75/20
[52] U.S. Cl. ........................................ 56/10.5; 74/479; 74/501 R
[58] Field of Search ................... 56/10.2, 10.5, 11.3, 56/11.6, 11.7, 11.8; 74/479, 501 R

[56] References Cited
U.S. PATENT DOCUMENTS 3,758,053 9/1973 Amelio et al. ..................... 74/501 R

*Primary Examiner*—Jay N. Eskovitz
*Attorney, Agent, or Firm*—Michael, Best & Friedrich

[57] ABSTRACT

Disclosed herein is a self-propelled lawn mover including apparatus selectively operable to start the mower motor and a cutter blade drive mechanism selectively connecting the motor in driving engagement with the cutter blade, the cutter blade drive mechanism being movable between a first drive mechanism position wherein the motor is drivingly engaged with the cutter blade and a second drive mechanism position wherein the motor is disengaged from the cutter blade. A wheel drive mechanism is also provided for selectively connecting the motor in driving engagement with the wheel to propel the mower. A starter interlock is provided for preventing starting of the motor unless the cutter blade drive mechanism is disengaged from the motor and the wheel drive is in a neutral position, the starter interlock operably connecting the cutter blade drive mechanism and the wheel drive to the apparatus selectively operable to start the mower motor.

16 Claims, 4 Drawing Figures

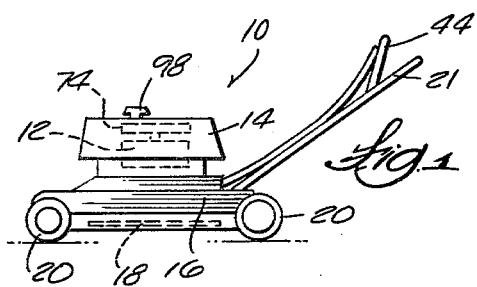
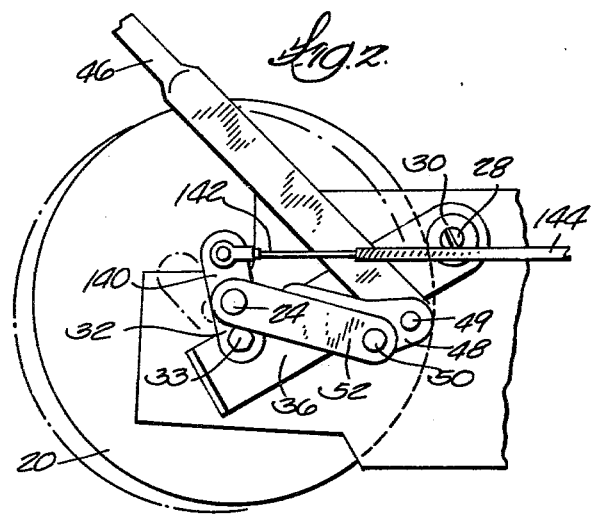
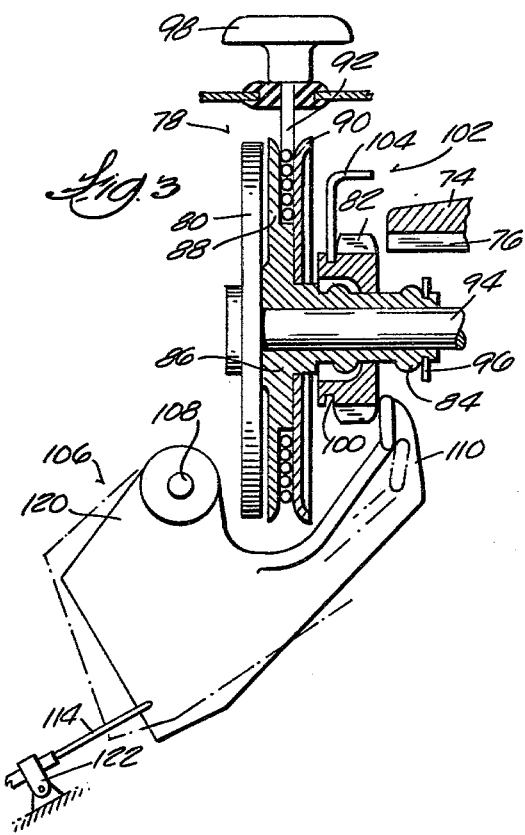
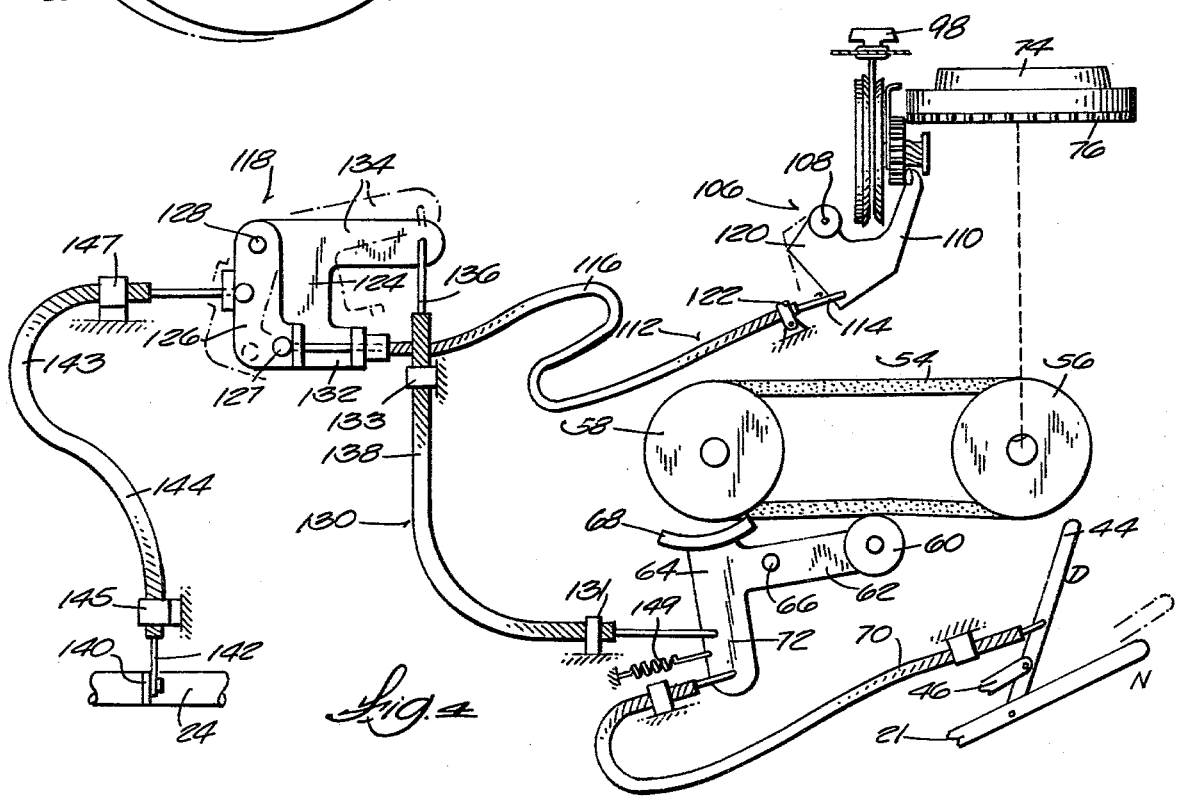

MULTI-FUNCTION INTERLOCK SELF-PROPELLED LAWN MOWER WITH BLADE CLUTCH

BACKGROUND OF THE INVENTION

The invention relates generally to self-propelled lawn mowers and more particularly to self-propelled lawn mowers having a disengageable cutter blade drive mechanism and an engine starter interlock means provided for preventing starting of the mower engine unless both the cutter blade drive and the mower wheel drive mechanism are disengaged.

U.S. Pat. No. 3,958,398 issued May 25, 1976 and assigned to the assignee of the present invention, illustrates a self-propelled lawn mower having a mower wheel drive mechanism movable between an engaged position and a disengaged position. An engine starting interlock means is also provided, connected to the wheel drive mechanism and functional to positively preclude starting of the mower engine unless the wheel drive mechanism is disengaged from the wheels.

U.S. patent application Ser. No. 704,282, filed July 12, 1976 by Martin and also assigned to the assignee of the present invention describes a lawn mower having a blade drive clutch mechanism between the mower prime mover and the mower blade to permit disengagement of the power delivered to the blade. The mower further includes an engine starting interlock connected to the blade drive clutch mechanism in such a manner that starting of the engine is precluded unless the blade drive mechanism is disengaged.

U.S. Pat. No. 3,971,353, issued July 27, 1976 shows an internal combustion engine having a starter interlock device and cables connecting a control lever to the starter interlock and the control lever and the starter interlock to a transmission.

Attention is further directed to the following U.S. Pat. Nos.:

Wemp, 2,505,447, Apr. 25, 1950;
Morse, 2,702,615, Feb. 22, 1955;
Morse, 2,705,485, Apr. 5, 1955;
Thomas, 3,435,698, Apr. 1, 1969.

SUMMARY OF THE INVENTION

The invention provides a self-propelled lawn mower including a blade housing, a cutter blade rotatably supported by the blade housing, a ground engaging wheel rotatably mounted on the blade housing and supporting the blade housing for movement along the ground, a prime mover supported on the blade housing for driving the cutter blade and the ground engaging wheel, and selectively operable means connected to the prime mover for starting the prime mover. The self-propelled lawn mower further includes a cutter blade drive mechanism for selectively connecting the prime mover in driving engagement with the cutter blade, the cutter blade drive mechanism being movable between a first drive mechanism position wherein the prime mover is drivingly engaged with the cutter blade and a second drive mechanism position wherein the prime mover is disengaged from the cutter blade. A wheel drive mechanism is provided for selectively connecting the prime mover in driving engagement with the wheel to propel the mower, the wheel drive mechanism including a wheel drive control means which is movable between a drive position wherein the prime mover is drivingly engaged with the wheel and a neutral position wherein the prime mover is disengaged from the wheel. A starter interlock means is further provided for preventing starting of the prime mover unless the cutter blade drive mechanism is in the second drive mechanism position and the control means is in the neutral position, the starter interlock means including means for operably connecting the cutter blade drive mechanism and the wheel drive control means to the selectively operable means.

One of the principal features of the invention is the provision in the means for operably connecting the cutter blade drive mechanism and the wheel drive control means to the selectively operable means of means for selectively preventing starting of the prime mover including a movable member shiftable between a first movable member position and a second movable member position wherein the movable member engages the means for starting the prime mover and prevents starting of the prime mover. The connecting means also includes a pair of levers movable toward and away from each other, means for connecting one of the levers to the cutter blade drive mechanism for moving that lever in a direction away from the other of the levers when the cutter blade drive mechanism is in the second position, and means for connecting the other of the levers to the wheel drive control means and for moving the other of the levers in a direction away from the first mentioned lever when the wheel drive control means is in the neutral position. The connecting means further includes means for connecting the levers to the movable member and for moving the movable member to its second position when the levers are moved away from each other.

Another of the principal features of the invention is the provision in the means for connecting the levers to the movable member of a cable having an outer member with first and second ends and an inner member slidable in the outer member and also having first and second ends respectively adjacent the first and second ends of the outer member, one of the first ends being connected to one of the levers, the other of the first ends being connected to the other of the levers, one of the second ends being connected to the movable member, and the other of the second ends being fixed.

Another of the principal features of the invention is the provision in the self-propelled lawn mower of a guiding handle on the blade housing, a cutter blade control member connected to the guiding handle and movable between a first cutter blade control member position when the cutter blade drive mechanism is in the first position and a second cutter blade control member position when the cutter blade drive mechanism is in the second position, and an element extending between one of the levers and the cutter blade control member for connecting that lever to the cutter blade drive mechanism.

Another of the principal features of the invention is the provision in the self-propelled lawn mower of a guiding handle connected to the blade housing, the wheel drive control means including an actuating means connected to the guiding handle for moving the wheel into and out of driving engagement with the wheel drive mechanism, and the means for connecting the other of the levers to the wheel drive control means including an element extending between that lever and the actuating means.

Other features and advantages of the embodiments of the invention will become apparent to those skilled in the art upon reviewing the following detailed description, the drawings and the appended claims.

BRIEF DESCRIPTION OF THE DRAWINGS

FIG. 1 is a side elevation view of a self-propelled lawn mower embodying various of the features of the invention.

FIG. 2 is an enlarged fragmentary, side elevation view of a portion of the wheel drive mechanism incorporated in the lawn mower of FIG. 1.

FIG. 3 is an enlarged fragmentary view, partially in section, of the engine starter mechanism of the lawn mower in FIG. 1 and the starter interlock mechanism.

FIG. 4 is a diagrammatic view of the starter interlock mechanism which is incorporated in the lawn mower of FIG. 1.

GENERAL DESCRIPTION

Before explaining the embodiments of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

Illustrated in FIG. 1 is a lawn mower 10 including a prime mover 12, such as an internal combustion engine or an electric motor, partially covered by a shroud 14 and supported on a blade housing 16. The lawn mower 10 includes a rotary cutter blade 18 located inside the blade housing 16, and is supported for travel along the ground by front and rear wheels 20. The mower 10 also includes a guide handle 21 for guiding the mower.

The mower 10 is powered by a drive mechanism or transmission which is operable to selectively connect the prime mover 12 in driving engagement with at least one of the rear wheels 20. In the specific construction illustrated, the transmission is generally arranged in the manner disclosed in U.S. Pat. 2,947,132 issued Aug. 2, 1960 to Shaw. More specifically, the transmission includes a rotatably supported drive shaft 28 (FIG. 2) disposed in parallel relationship to a rotatably supported rear axle 24. The drive shaft 28 is drivingly connected to the prime mover 12 by a suitable drive arrangement, such as by a pulley and gear arrangement described in the Shaw patent. Located on at least one end portion of the drive shaft 28 is a drive roller 30 for selectively engaging the outer periphery of the adjacent rear wheel 20 for driving the mower 10. Means are provided for moving the rear wheels 20 relative to the drive shaft 28 and the drive roller 30 and between a drive position wherein the rear wheel 20 frictionally engages the drive roller 30 as shown in solid lines in FIG. 2 and a nondriving position wherein the rear wheel 20 is disengaged from the drive roller 30 as shown by dashed lines in FIG. 2. While various arrangements can be used, in the specific construction illustrated, such means is generally arranged in the manner disclosed in the above identified U.S. Shaw patent. The construction and operation of the means for moving the drive shaft 28 and the rear wheels 20 relative to each other will be briefly described and reference can be made to the Shaw patent for a more detailed description.

The rear wheels 20 are rotatable relative to the rear axle 24 which is carried by links or levers 32 (one shown) pivotally mounted on arms 36 (one shown) at 33. The arms 36 are suitably supported from opposite sides of the blade housing 16 for pivotal movement relative to the blade housing 16 about the axis of the drive shaft 28. The levers 32 project upwardly from the arms 36 to accommodate fore and aft movement of the axle 24 and the rear wheels 20 relative to the drive shaft 28 for respectively engaging the rear wheels 20 with the drive roller 30 and disengaging the rear wheels 20 from the drive roller 30.

Movement of the rear wheels 20 between the drive or engaged position and the nondriving or disengaged position is effected by a control handle 44 (FIGS. 1 and 4) mounted on the mower guide handle 21 for oscillatory movement, and a longitudinally movable actuator link 46. The actuator link 46 is operatively connected at its upper end to the control handle 44 and is connected at its lower end to the wheel axle 24 through a linkage arrangement including a lever 48 pivotally connected to the actuator link 46 at 49 and pivotally connected at 50 to another lever 52 which is pivotally mounted on the wheel axle 24.

When the control handle 44 is moved to the drive position (i.e., to the forward control handle position shown in FIG. 4), the actuator link 46 is moved downwardly and moves the linkage arrangement to the position shown in FIG. 2 wherein the axle 24 is advanced to cause engagement of the wheels 20 with the drive roller 30. When the control handle 44 is moved to the neutral or nondriving position (i.e., moved rearwardly to the dashed line position shown in FIG. 4), the actuator link 46 is moved upwardly and moves the linkage arrangement to a position wherein the wheel axle 24 is retracted to disengage the rear wheels from the drive roller 30.

A suitable cutter blade drive mechanism is also provided for selectively connecting the prime mover 12 in driving engagement with the cutter blade 18. Various arrangements can be used for selectively engaging and disengaging the prime mover 12 and the cutter blade 18. For instance, various jaw clutch constructions, or disc clutch constructions, or centrifugal clutch constructions, or endless belt clutch constructions can be used. In the illustrated construction shown in FIG. 4, the cutter blade drive mechanism is of the endless belt type and includes an endless belt 54 which is trained around a drive pulley 56 driven by the prime mover 12 and a driven pulley 58 which, in turn, drives the cutter blade 18.

The cutter blade drive mechanism also includes an idler wheel or pulley 60 which is rotatably carried on one arm 62 of an operating link 64 which is in the form of a bell crank lever and which is pivotally mounted at 66 on the blade housing 16. The operating link 64 and the idler wheel 60 are movable together about the pivot 66 between a first or drive position engaging the idler wheel 60 with the endless belt 54 so as to remove slack from the belt 54 and thereby to effect rotation of the cutter blade 18 by the prime mover 12, and a second or neutral position in which the idler wheel 60 is operatively disengaged from the endless belt 54 so as to discontinue power transmission from the prime mover 12 to the cutter blade 18.

Preferably, the operating link 64 also carries a brake shoe 68 which is engageable with the endless belt 54 or the driven pulley 58 so as to brake the cutter blade 18 when the operating link or lever 64 is in the second or neutral position and which is moved clear of the driven pulley 58 or endless belt 54 when the operating link 64 is in the first or drive position so as thereby to permit unhindered driving of the cutter blade 18 by the prime mover 12.

The control handle 44 is connected to the operating link 64 of the cutter blade drive mechanism through a suitable linkage arrangement such as for instance the illustrated push-pull element or cable 70 which connects the control handle 44 to the other arm 72 of the operating link 64. Other suitable linkages could be employed. The linkage is arranged so that, when the control handle 44 is in the neutral position shown in the dashed lines in FIG. 4, the operating link 64 is in the neutral position wherein the idler wheel 60 is operatively disengaged from the endless belt 54 and the brake shoe 68 is in braking engagement with one or both of the driven pulley 58 and the endless belt 54 so as to prevent rotation of the cutter blade 18. When the control handle 44 is in the drive position, the operating link 64 is in the drive position wherein the idler wheel 60 is operatively engaged with the endless belt 54 so as to effect transmission of driving power from the prime mover 12 to the cutter blade 18 and the brake shoe 68 is located in the nonbraking position permitting unhindered cutter blade rotation.

Means are also provided for biasing the cutter blade drive mechanism toward the neutral position wherein the operating link 64 is in the position operatively disengaging the idler wheel 60 from the endless belt 54 and engaging the brake shoe 68 so as to stop rotation of the cutter blade 18. While various arrangements can be employed, in the illustrated construction there is provided a tension spring 149 which, at one end, is anchored to the housing 16, and which at the other end, is connected to the arm 72 of the operating link 64 so as to normally bias the operating link 64 for rotation in the clockwise direction as seen in FIG. 4.

In the construction shown in FIG. 3, the prime mover 12 constitutes an internal combustion engine having a rotatable flywheel 74 carrying an engine starter gear 76. Also mounted on the mower 10 is an engine starter mechanism 78 which is adapted to be actuated so as to engage the starter gear 76 and rotate the engine for starting. While various arrangements can be used, in the specific construction illustrated, the starter mechanism 78 includes a cylindrical frame or housing 80 fixed relative to the engine 12, a starter pinion 82 which is meshable with starter gear 76 and means for rotating the starter pinion 82 and axially displacing it between a retracted position axially spaced from the starter gear 76 and an advanced position in driving engagement with the starter gear 76. This last mentioned means includes a combined pulley and worm drive gear assembly which includes a drive worm 84 carrying the starter pinion 82.

More particularly, the combined pulley and drive assembly has a drive member 86 including the drive worm 84 and a first circular pulley member 88. A second circular pulley member 90 is connected to the drive member 86 and cooperates with the first pulley member 88 to form a pulley for a pull rope 92. The drive member 86 is mounted on a shaft or pin 94 for rotation relative to the shroud 14. Located near the outer end of the drive worm 84 is a retainer 96 for limiting the axial advance of the starter pinion 82 toward the starter gear 76.

The pull rope 92 includes a handle 98 and is normally wound up on the pulley formed between the pulley members 88 and 90 by a rewind or recoil spring (not shown) which is located inside the shroud 14 and has one end anchored to the drive member 86 with the other end anchored to the inside of the shroud 14. Mounted in an annular groove 100 on the starter pinion 82 for common axial movement with the starter pinion is a drag spring 102 which frictionally restrains rotary movement of the starter pinion 82. The drag spring 102 includes an offset leg 104 which, after initial rotation of the starter pinion 82, engages a fixed portion of the mower to prevent further rotation of the drag spring 102 even though the starter pinion 82 continues to rotate.

In operation, when the pull rope 92 is pulled, the drive worm 84 rotates to coil or to wind the recoil spring 102 inside the shroud 14. Upon release of the pull rope 92, the recoil spring 102 uncoils or unwinds and thereby rotates the drive worm 84 in a counterclockwise direction, simultaneously rewinding the pull rope 92 on the pulley. In response to the rotation of the drive worm 84 during pulling of the pull rope 92, the drag spring 102 frictionally restrains rotation of the starter pinion 82 causing the starter pinion 82 to travel axially on the drive worm 84 from the retracted position to the advanced starter gear engagement position. Upon engaging the retainer 96, the starter pinion 82 meshes with the starter gear 76 and rotates with the drive worm 84, while rotating relative to the drag spring 102, to drive the starter gear 76.

The invention encompasses lawn mowers employing an electrical motor as the prime mover or motive source, as well as other starter mechanisms, as for instance, an electrically driven starter or other stored energy starting system, such as compressed gas, or a starter mechanism in which the starter pinion is displaced to the starter gear engaging position in response to rotation accompanying unwinding of a recoil spring which previously has been tensioned by a pull rope or other recoil spring tensioning means. Also, lawn mowers using reel-type cutter blades are within the invention.

In accordance with one embodiment of the invention, a starter interlock mechanism is provided for precluding starting of the engine unless the cutter blade drive mechanism is in the neutral drive position and the drive wheel 20 is disengaged from the drive roller 30. If either the cutter blade drive mechanism is in the cutter blade drive position or the drive wheel 20 is engaged with the drive roller 30, the starter interlock mechanism will prevent the engine from being started. The starter interlock mechanism is illustrated in FIGS. 3 and 4 and includes a blocking element 106 which is selectively engageable with the starter pinion 82 to prevent starting of the engine, and further includes means for moving the blocking element 106 into engagement with the starter pinion 82 unless both the cutter blade drive mechanism and the wheel drive mechanism are in neutral.

The blocking element 106 is connected to the blade housing 16 by a pivot 108 for pivotal movement between a blocking position shown in solid lines in FIG. 3, wherein the blocking element prevents movement of the starter pinion 82 toward the starter gear engaging position, and a nonblocking position shown in phantom in FIGS. 3 and 4. The blocking element 106 of the starter interlock mechanism includes an arm 110 which is engageable with the starter pinion 82 when the blocking element is in the solid line position shown in FIGS. 3 and 4, to prevent axial movement of the starter pinion 82 toward the starter gear engaging position, thereby preventing the engine from being started. When the blocking element 106 is pivoted clockwise to the dashed line position in FIGS. 3 and 4, the starter pinion 82 is free to move toward the starter gear engaging position so as to permit the engine to be started.

The means of the starter interlock mechanism for moving the blocking element 106 into engagement with the starter pinion 82 unless the cutter blade drive mechanism is in neutral and the drive wheel 20 is disengaged from the drive roller 30 includes a lever assembly 118 shown in FIG. 4 and operably connected to the blocking element 106 and connected to both the blade clutch mechanism and the wheel drive mechanism. The lever assembly 118 includes a lever 124 and a lever 126 each pivotally supported for movement about a pivot pin 128 attached to the blade housing 16. The lever 124 is pivotal around the pivot pin 128 and has a bell crank configuration including a pair of transverse lever arms 132 and 134. The lever arm 134 is operatively connected to the link 64 of the blade clutch mechanism by a push-pull cable 130 such that the lever 124 of the lever assembly 118 is movable in response to movement of link 64 of the blade clutch mechanism. The push-pull cable 130 includes an inner wire 136 which is movable in a guide conduit 138 and which is attached at one of its ends to the free end of the lever arm 134 and is connected at the other end to the arm of the operating link 64 of the blade clutch mechanism. Pivotal movement of the operating link 64 to the position wherein the idler wheel 60 is operatively disengaged from the belt 54, causes the inner wire 136 to move the lever 124 in a counterclockwise direction as seen in FIG. 4 to the position shown in phantom. The opposite ends of the guide conduit 138 of the second push-pull cable 130 are secured against movement by restraining brackets 131 and 133, each fixed to the housing 16.

The other lever 126 of the lever assembly 118 is operatively connected to the wheel drive mechanism by a push-pull cable 144 including an inner wire 142 and an outer conduit 143. The opposite ends of the conduit 143 are secured against movement by restraining brackets 145 and 147 each fixed to the housing 16. The lever 32 of the wheel drive mechanism includes an upper extension 140 shown in FIG. 2. The inner wire 142 of the push-pull cable 144 is attached at one end to the lever arm 140, and is attached at its other end to the lever 126 at a point intermediate the opposite ends of the lever 126. Movement of the axle 24 and the wheel 20 to the rearward wheel disengaged position shown in phantom in FIG. 2 thus causes the inner wire 142 to pivot lever 126 in a clockwise direction as seen in FIG. 4 to the position shown in phantom.

The blocking element 106 is connected to each of the levers 124 and 126 of the lever assembly 118 by a push-pull cable 112 which includes an inner wire 114 slidably mounted in a guide conduit 116. One end of the inner wire 114 is attached to a lever arm 120 of the blocking element 106 and the other end of the inner wire 114 is attached to the free end 127 of the lever 126. The end of the guide conduit 116 adjacent the blocking element 106 is secured against movement by a bracket 122 attached to the housing 16. The other end of the guide conduit 116 is attached to the lever arm 132 of the lever 124.

Both of the levers 124 and 126 of the lever assembly 118 must be moved in respective opposite pivotal directions to the dashed line positions shown in FIG. 4 to cause sufficient relative movement of the inner wire 114 and conduit 116 in order to cause sufficient pivotal movement of pivot member 106 to release the starter pinion 82 for movement toward the starter gear engaging position. Movement of only one of the levers 124 and 126 to the respective dashed line positions shown in FIG. 4 will not cause sufficient relative movement between the inner wire 114 and conduit 116 to move blocking member 106 sufficiently that it assumes a non-blocking position. Accordingly, both the wheel drive mechanism which is connected to lever 126 and the blade clutch mechanism which is connected to lever 124 must be moved to the neutral position to permit engagement of the starter pinion with the starter gear of the engine.

Various of the features of the invention are set forth in the following claims.

What is claimed is:

1. A self-propelled lawn mower comprising a blade housing, a cutter blade rotatably supported by said blade housing, a ground engaging wheel rotatably mounted on said blade housing and supporting said blade housing for movement along the ground, a prime mover supported on said blade housing for driving said cutter blade and said ground engaging wheel, selectively operable means connected to said prime mover for starting said prime mover, a cutter blade drive mechanism for selectively connecting said prime mover in driving engagement with said cutter blade, said cutter blade drive mechanism being movable between a first drive mechanism position wherein said prime mover is drivingly engaged with said cutter blade and a second drive mechanism position wherein said prime mover is disengaged from said cutter blade, a wheel drive mechanism for selectively connecting said prime mover in driving engagement with said wheel to propel the mower, said wheel drive mechanism including a wheel drive control means which is movable between a drive position wherein said prime mover is drivingly engaged with said wheel and a neutral position wherein said prime mover is disengaged from said wheel, and starter interlock means for preventing starting of said prime mover unless said cutter blade drive mechanism is in said second drive mechanism position and said control means is in said neutral position, said starter interlock means including means for operably connecting said cutter blade drive mechanism and said wheel drive control means to said selectively operable means.

2. A self-propelled lawn mower as set forth in claim 1 wherein said means for operably connecting said cutter blade drive mechanism and said wheel drive control means to said selectively operable means includes means for selectively preventing starting of said prime mover comprising a movable member shiftable between a first movable member position and a second movable member position wherein said movable member engages said means for starting said prime mover and prevents starting of said prime mover, a pair of levers movable toward and away from each other, means for connecting one of said levers to said cutter blade drive mechanism and for moving said one lever in a direction away from the other of said levers when said cutter blade drive mechanism is in said second position, means for connecting said other of said levers to said wheel drive control means and for moving said other of said levers in a direction away from said one of said levers when said wheel drive control means is in said neutral position, and means for connecting said levers to said movable member and for moving said movable member to said second movable member position when said levers are moved away from each other.

3. A self-propelled lawn mower as set forth in claim 2 wherein said means for connecting said levers to said movable member includes a cable having an outer member with first and second ends and an inner member slidable in said outer member and having first and second ends respectively adjacent said first and second ends of said outer member, one of said first ends being connected to one of said levers, the other of said first ends being connected to the other of said levers, and one of said second ends being connected to said movable member.

4. A self-propelled lawn mower as set forth in claim 3 wherein the other of said second ends is fixed.

5. A self-propelled lawn mower as set forth in claim 4 and further including a common pivot pin for pivotally supporting said levers.

6. A self-propelled lawn mower as set forth in claim 2 wherein said prime mover comprises an engine including a starter gear, wherein said means for starting said prime mover comprises a starter mechanism including a starter pinion movable to an engaged position in mesh with said starter gear, and means for rotating said pinion to start said engine, and wherein said starter interlock means includes means for preventing engagement of said starter pinion with said starter gear.

7. A self-propelled lawn mower as set forth in claim 2 and further including a guiding handle on said blade housing, wherein said cutter blade drive mechanism includes a cutter blade control member connected to said guiding handle and movable between a first cutter blade control member position when said cutter blade drive mechanism is in said first position and a second cutter blade control member position when said cutter blade drive mechanism is in said second position, and wherein said means for connecting one of said levers to said cutter blade drive mechanism includes an element extending between said one of said levers and said cutter blade control member.

8. A self-propelled lawn mower as set forth in claim 2 further including a guiding handle on said blade housing, and wherein said wheel drive control means includes an actuating means connected to said guiding handle and for moving said wheel into and out of driving engagement with said wheel drive mechanism, and said means for connecting said other of said levers to said wheel drive control means includes an element extending between said other of said levers and said actuating means.

9. A lawn mower in accordance with claim 2 wherein said prime mover comprises an engine having a starter gear, wherein said selectively operable means for starting said prime mover comprises a starter mechanism including a rotatable starter shaft, a starter pinion carried on said shaft for movement relative to said shaft in response to rotation of said shaft to an engaged position in mesh with said starter gear, and means connected to said shaft for rotating said shaft to start said engine, and wherein said movable member is operative in said second movable member position to prevent said starter pinion from meshing with said starter gear.

10. A lawn mower according to claim 9 wherein said starter pinion is carried on said shaft for axial movement relative to said shaft and said movable member is a blocking element pivotally mounted for movement between a blocking position to prevent movement of said starter pinion into meshing engagement with said starter gear and a nonblocking position permitting movement of said starter pinion into engagement with said starter gear.

11. A self-propelled lawn mower as set forth in claim 10 and further including a guiding handle on said blade housing, wherein said cutter blade drive mechanism includes a cutter blade control member connected to said guiding handle and movable between a first cutter blade control member position when said cutter blade drive mechanism is in said first position and a second cutter blade control member position when said cutter blade drive mechanism is in said second position, and wherein said means for connecting one of said levers to said cutter blade drive mechanism includes an element extending between said one of said levers and said cutter blade control member.

12. A self-propelled lawn mower as set forth in claim 10 further including a guiding handle on said blade housing, and wherein said wheel drive control means includes an actuating means connected to said guiding handle and for moving said wheel into and out of driving engagement with said wheel drive mechanism, and said means for connecting said other of said levers to said wheel drive control means includes an element extending between said other of said levers and said actuating means.

13. A self-propelled lawn mower as set forth in claim 1 wherein said prime mover comprises an engine including a starter gear, wherein said means for starting said prime mover comprises a starter mechanism including a starter pinion movable to an engaged position in mesh with said starter gear, and means for rotating said pinion to start said engine, and wherein said starter interlock means includes means for preventing engagement of said starter pinion with said starter gear.

14. A lever assembly for moving a component movable between a first component position and a second component position, the lever assembly comprising a pair of levers movable independently of each other and toward and away from each other, and a cable connecting said levers to the component and for moving the component from the first component position to the second component position when said levers are moved away from each other, said cable including an outer member with first and second ends and an inner member slidable in said outer member and having first and second ends respectively adjacent said first and second ends of said outer member, one of said first ends being connected to one of said levers, the other of said first ends being connected to the other of said levers, and one of said second ends being connected to said movable component.

15. A lever assembly as set forth in claim 14 wherein the other of said second ends is fixed.

16. A lever assembly as set forth in claim 15 and further including a common pivot pin for pivotally supporting said levers.

* * * * *